(12) United States Patent
Moorer et al.

(10) Patent No.: US 8,209,398 B2
(45) Date of Patent: Jun. 26, 2012

(54) INTERNET PROTOCOL BASED MEDIA STREAMING SOLUTION

(75) Inventors: Seale Moorer, Westerville, OH (US);
Eric Eichensehr, Westerville, OH (US);
Adam Love, Westerville, OH (US)

(73) Assignee: Exceptional Innovation LLC, Westerville, OH (US)

( * ) Notice: Subject to any disclaimer, the term of this patent is extended or adjusted under 35 U.S.C. 154(b) by 742 days.

(21) Appl. No.: 11/686,836

(22) Filed: Mar. 15, 2007

(65) Prior Publication Data

US 2007/0220165 A1    Sep. 20, 2007

Related U.S. Application Data (60) Provisional application No. 60/782,734, filed on Mar. 16, 2006, provisional application No. 60/782,598, filed on Mar. 16, 2006, provisional application No. 60/782,635, filed on Mar. 16, 2006, provisional application No. 60/782,596, filed on Mar. 16, 2006, provisional application No. 60/782,599, filed on Mar. 16, 2006, provisional application No. 60/782,600, filed on Mar. 16, 2006, provisional application No. 60/782,634, filed on Mar. 16, 2006, provisional application No. 60/782,595, filed on Mar. 16, 2006, provisional application No. 60/785,275, filed on Mar. 24, 2006, provisional application No. 60/793,257, filed on Apr. 20, 2006, provisional application No. 60/747,726, filed on May 19, 2006, provisional application No. 60/746,287, filed on May 3, 2006, provisional application No. 60/786,119, filed on Mar. 27, 2006, provisional application No. 60/857,774, filed on Nov. 9, 2006.

(51) Int. Cl.
*G06F 15/16* (2006.01)

(52) U.S. Cl. .................. 709/218; 709/217; 709/231

(58) Field of Classification Search ............... 709/231
See application file for complete search history.

(56) References Cited

U.S. PATENT DOCUMENTS

| | | | |
|---|---|---|---|
| 4,567,557 A | 1/1986 | Burns | |
| 4,808,841 A | 2/1989 | Ito et al. | |
| 4,989,081 A | 1/1991 | Miyagawa et al. | |
| 5,086,385 A | 2/1992 | Launey et al. | |
| 5,105,186 A | 4/1992 | May | |
| 5,218,552 A | 6/1993 | Stirk | |
| 5,237,305 A | 8/1993 | Ishijuro | |
| 5,282,028 A | 1/1994 | Johnson et al. | |
| 5,502,618 A | 3/1996 | Chiou | |
| 5,565,894 A | 10/1996 | Bates et al. | |
| 5,579,221 A | 11/1996 | Mun | |
| 5,598,523 A | 1/1997 | Fujita | |

(Continued)

OTHER PUBLICATIONS

Fred Halsall; Data Communications, Computer Networks and Open Systems; 1996; Addison-Wesley Publishers Ltd.; Fourth Edition; pp. 15, 18.

*Primary Examiner* — Wing Chan
*Assistant Examiner* — David X Yi
(74) *Attorney, Agent, or Firm* — Baker & Hostetler, LLP (57) ABSTRACT

A system and method for streaming media data in a Web Service environment between two or more units are disclosed. The first unit processes the media data for transfer, using a media streaming application. A network implemented with Web Service transfers the processed media data using a real-time media streaming protocol. The second unit renders the processed media data for playback, using the media streaming application.

22 Claims, 7 Drawing Sheets

U.S. PATENT DOCUMENTS

| | | | |
|---|---|---|---|
| 5,621,662 A | 4/1997 | Humphries et al. |
| 5,623,392 A | 4/1997 | Ma |
| 5,666,172 A | 9/1997 | Ida et al. |
| 5,706,191 A | 1/1998 | Bassett et al. |
| 5,706,290 A | 1/1998 | Shaw et al. |
| 5,748,444 A | 5/1998 | Honda et al. |
| 5,787,259 A | 7/1998 | Haroun |
| 5,831,823 A | 11/1998 | Hoedl |
| 5,850,340 A | 12/1998 | York |
| 5,877,957 A | 3/1999 | Bennett |
| 5,922,047 A | 7/1999 | Newlin et al. |
| 5,956,025 A | 9/1999 | Goulden et al. |
| 6,020,881 A | 2/2000 | Naughton et al. |
| 6,029,092 A | 2/2000 | Stein |
| 6,061,602 A | 5/2000 | Meyer |
| 6,112,127 A | 8/2000 | Bennett |
| 6,139,177 A | 10/2000 | Venkatraman et al. |
| 6,147,601 A | 11/2000 | Sandelman et al. |
| 6,154,681 A | 11/2000 | Drees et al. |
| 6,160,477 A | 12/2000 | Sandelman et al. |
| 6,175,872 B1 | 1/2001 | Neumann et al. |
| 6,182,094 B1 | 1/2001 | Humpleman et al. |
| 6,192,282 B1 | 2/2001 | Smith et al. |
| 6,198,479 B1 | 3/2001 | Humpleman et al. |
| 6,201,523 B1 | 3/2001 | Akiyama et al. |
| 6,222,729 B1 | 4/2001 | Yoshikawa |
| 6,243,707 B1 | 6/2001 | Humpleman et al. |
| 6,263,260 B1 | 7/2001 | Bodmer et al. |
| 6,268,857 B1 | 7/2001 | Fishkin et al. |
| 6,275,922 B1 | 8/2001 | Bertsch |
| 6,278,676 B1 | 8/2001 | Anderson et al. |
| 6,288,716 B1 | 9/2001 | Humpleman et al. |
| 6,313,990 B1 | 11/2001 | Cheon |
| 6,314,326 B1 | 11/2001 | Fuchu |
| 6,353,853 B1 | 3/2002 | Gravlin |
| 6,385,495 B1 | 5/2002 | Bennett |
| 6,389,331 B1 | 5/2002 | Jensen et al. |
| 6,402,109 B1 | 6/2002 | Dittmer |
| 6,405,103 B1 | 6/2002 | Ryan et al. |
| 6,456,892 B1 | 9/2002 | Dara-Abrams et al. |
| 6,462,654 B1 | 10/2002 | Sandelman et al. |
| 6,473,661 B1 | 10/2002 | Wollner |
| 6,496,575 B1 | 12/2002 | Vasell et al. |
| 6,522,346 B1 | 2/2003 | Meyer |
| 6,523,696 B1 | 2/2003 | Saito et al. |
| 6,526,581 B1 | 2/2003 | Edson |
| 6,546,419 B1 | 4/2003 | Humpleman |
| 6,580,950 B1 | 6/2003 | Johnson et al. |
| 6,587,739 B1 | 7/2003 | Abrams et al. |
| 6,609,038 B1 | 8/2003 | Croswell et al. |
| 6,615,088 B1 | 9/2003 | Myer et al. |
| 6,633,781 B1 | 10/2003 | Lee et al. |
| 6,640,141 B2 | 10/2003 | Bennett |
| 6,663,781 B1 | 12/2003 | Huling |
| 6,690,411 B2 | 2/2004 | Naidoo et al. |
| 6,690,979 B1 | 2/2004 | Smith |
| 6,735,619 B1 | 5/2004 | Sawada |
| 6,756,998 B1 | 6/2004 | Bilger |
| 6,763,040 B1 | 7/2004 | Hite et al. |
| 6,778,868 B2 | 8/2004 | Imamura et al. |
| 6,782,294 B2 | 8/2004 | Reich et al. |
| 6,792,319 B1 | 9/2004 | Bilger |
| 6,792,323 B2 | 9/2004 | Krzyzanowski et al. |
| 6,792,480 B2 | 9/2004 | Chaiken et al. |
| 6,823,223 B2 | 11/2004 | Gonzales et al. |
| 6,834,208 B2 | 12/2004 | Gonzales et al. |
| 6,838,978 B2 | 1/2005 | Aizu et al. |
| 6,845,275 B2 | 1/2005 | Gasiorek et al. |
| 6,850,149 B2 | 2/2005 | Park |
| 6,859,669 B2 | 2/2005 | An |
| 6,865,428 B2 | 3/2005 | Gonzales et al. |
| 6,868,292 B2 | 3/2005 | Ficco |
| 6,868,293 B1 | 3/2005 | Schurr et al. |
| 6,870,555 B2 | 3/2005 | Sekiguchi |
| 6,891,838 B1 | 5/2005 | Petite et al. |
| 6,909,921 B1 | 6/2005 | Bilger |
| 6,912,429 B1 | 6/2005 | Bilger |
| 6,924,727 B2 | 8/2005 | Nagaoka et al. |
| 6,928,576 B2 | 8/2005 | Sekiguchi |
| 6,930,599 B2 | 8/2005 | Naidoo et al. |
| 6,957,110 B2 | 10/2005 | Wewalaarachchi et al. |
| 6,957,275 B1 | 10/2005 | Sekiguchi |
| 6,961,763 B1 | 11/2005 | Wang et al. |
| 6,965,935 B2 | 11/2005 | Diong |
| 6,967,565 B2 | 11/2005 | Lingermann |
| 6,980,868 B2 | 12/2005 | Huang et al. |
| 6,990,379 B2 | 1/2006 | Gonzales et al. |
| 7,047,092 B2 | 5/2006 | Wimsatt |
| 7,130,719 B2 | 10/2006 | Ehlers et al. |
| 7,136,709 B2 | 11/2006 | Arling |
| 7,170,422 B2 | 1/2007 | Nelson et al. |
| 7,174,385 B2 * | 2/2007 | Li .................. 709/231 |
| 7,200,683 B1 | 4/2007 | Wang et al. |
| 7,201,356 B2 | 4/2007 | Huang |
| 7,203,486 B2 | 4/2007 | Patel |
| 7,225,037 B2 | 5/2007 | Shani |
| 7,260,604 B2 | 8/2007 | Kuki |
| 7,370,280 B2 | 5/2008 | Ho et al. |
| 7,380,250 B2 | 5/2008 | Schechter et al. |
| 7,453,685 B2 | 11/2008 | Lube |
| 7,505,889 B2 * | 3/2009 | Salmonsen et al. .......... 709/231 |
| 2001/0034754 A1 | 10/2001 | Elwahab et al. |
| 2001/0036192 A1 | 11/2001 | Chiles et al. |
| 2001/0039460 A1 | 11/2001 | Aisa |
| 2002/0000092 A1 | 1/2002 | Sharood et al. |
| 2002/0016639 A1 | 2/2002 | Smith et al. |
| 2002/0029085 A1 | 3/2002 | Park |
| 2002/0031120 A1 | 3/2002 | Rakib |
| 2002/0033760 A1 | 3/2002 | Kobayashi |
| 2002/0035404 A1 | 3/2002 | Ficco et al. |
| 2002/0044042 A1 | 4/2002 | Christensen |
| 2002/0047774 A1 | 4/2002 | Christensen |
| 2002/0111698 A1 | 8/2002 | Graziano et al. |
| 2002/0126443 A1 | 9/2002 | Zodnik |
| 2002/0152311 A1 | 10/2002 | Veltman et al. |
| 2002/0165953 A1 | 11/2002 | Diong |
| 2002/0174178 A1 | 11/2002 | Stawikowski |
| 2002/0180579 A1 | 12/2002 | Nagaoka et al. |
| 2002/0194328 A1 | 12/2002 | Hallenbeck |
| 2002/0196158 A1 | 12/2002 | Lee |
| 2003/0009515 A1 | 1/2003 | Lee et al. |
| 2003/0009537 A1 | 1/2003 | Wang |
| 2003/0028270 A1 | 2/2003 | Peterson et al. |
| 2003/0033028 A1 | 2/2003 | Bennett |
| 2003/0034898 A1 | 2/2003 | Shamoon et al. |
| 2003/0037166 A1 | 2/2003 | Ueno et al. |
| 2003/0040812 A1 | 2/2003 | Gonzales et al. |
| 2003/0040813 A1 | 2/2003 | Gonzales et al. |
| 2003/0040819 A1 | 2/2003 | Gonzales |
| 2003/0065407 A1 | 4/2003 | Johnson et al. |
| 2003/0069887 A1 | 4/2003 | Lucovsky et al. |
| 2003/0074088 A1 | 4/2003 | Gonzales |
| 2003/0083758 A1 | 5/2003 | Williamson |
| 2003/0101304 A1 | 5/2003 | King et al. |
| 2003/0103088 A1 | 6/2003 | Dresti et al. |
| 2003/0198938 A1 | 10/2003 | Murray |
| 2003/0200009 A1 | 10/2003 | von Kannewurff |
| 2003/0233432 A1 | 12/2003 | Davis et al. |
| 2004/0003051 A1 | 1/2004 | Krzyzanowski et al. |
| 2004/0004810 A1 | 1/2004 | Kim |
| 2004/0010327 A1 | 1/2004 | Terashima et al. |
| 2004/0010561 A1 | 1/2004 | Kim |
| 2004/0039459 A1 | 2/2004 | Daugherty et al. |
| 2004/0092282 A1 | 5/2004 | Kim et al. |
| 2004/0133314 A1 | 7/2004 | Ehlers |
| 2004/0138768 A1 | 7/2004 | Murray |
| 2004/0143629 A1 | 7/2004 | Bodin et al. |
| 2004/0176877 A1 | 9/2004 | Hesse |
| 2004/0213384 A1 | 10/2004 | Alles |
| 2004/0215694 A1 | 10/2004 | Podolsky |
| 2004/0215778 A1 | 10/2004 | Hesse et al. |
| 2004/0215816 A1 | 10/2004 | Hayes et al. |
| 2004/0237107 A1 | 11/2004 | Staples |
| 2004/0243257 A1 | 12/2004 | Theimer |
| 2004/0249922 A1 | 12/2004 | Hackman |
| 2004/0260407 A1 | 12/2004 | Wimsatt |
| 2004/0260427 A1 | 12/2004 | Wimsatt |

| | | | | | | |
|---|---|---|---|---|---|---|
| 2004/0266439 | A1 | 12/2004 | Lynch et al. | 2005/0198063 A1 | 9/2005 | Thomas et al. |
| 2004/0267385 | A1 | 12/2004 | Lingemann | 2005/0198188 A1 | 9/2005 | Hickman |
| 2004/0267876 | A1 | 12/2004 | Kakivaya et al. | 2005/0198304 A1 | 9/2005 | Oliver et al. |
| 2004/0267909 | A1 | 12/2004 | Autret | 2005/0232583 A1 | 10/2005 | Kubota |
| 2005/0009498 | A1 | 1/2005 | Ho | 2005/0262227 A1 | 11/2005 | Heller et al. |
| 2005/0021805 | A1 | 1/2005 | De Petris et al. | 2005/0267605 A1 | 12/2005 | Lee et al. |
| 2005/0035717 | A1 | 2/2005 | Adamson | 2005/0271355 A1 | 12/2005 | Gilor |
| 2005/0038708 | A1 | 2/2005 | Wu | 2006/0004920 A1 | 1/2006 | Hallenbeck |
| 2005/0055108 | A1 | 3/2005 | Gonzales | 2006/0009861 A1 | 1/2006 | Bonasia et al. |
| 2005/0071419 | A1 | 3/2005 | Lewontin | 2006/0020353 A1 | 1/2006 | Gonzales et al. |
| 2005/0080879 | A1 | 4/2005 | Kim et al. | 2006/0053234 A1 | 3/2006 | Kumar et al. |
| 2005/0085930 | A1 | 4/2005 | Gonzales | 2006/0058900 A1 | 3/2006 | Johanson et al. |
| 2005/0090915 | A1 | 4/2005 | Geiwitz | 2006/0069934 A1 | 3/2006 | Esch et al. |
| 2005/0096753 | A1 | 5/2005 | Arling et al. | 2006/0106933 A1 | 5/2006 | Huang et al. |
| 2005/0107897 | A1 | 5/2005 | Callaghan | 2006/0118694 A1 | 6/2006 | Lee et al. |
| 2005/0108091 | A1 | 5/2005 | Sotak | 2006/0126646 A1 | 6/2006 | Bedingfield, Sr. |
| 2005/0113021 | A1 | 5/2005 | Gosieski, Jr. et al. | 2006/0155802 A1 | 7/2006 | He et al. |
| 2005/0113943 | A1 | 5/2005 | Nian | 2007/0053376 A1 | 3/2007 | Oshima et al. |
| 2005/0119767 | A1 | 6/2005 | Kiwimagi et al. | 2007/0073419 A1 | 3/2007 | Sesay |
| 2005/0119793 | A1 | 6/2005 | Amundson et al. | 2007/0083679 A1 | 4/2007 | Kikuchi |
| 2005/0125083 | A1 | 6/2005 | Kiko | 2007/0104332 A1 | 5/2007 | Clemens et al. |
| 2005/0131551 | A1 | 6/2005 | Ruutu | 2007/0153459 A1 | 7/2007 | Wohlford et al. |
| 2005/0131553 | A1 | 6/2005 | Yoon et al. | 2007/0162567 A1 | 7/2007 | Ding |
| 2005/0131558 | A1 | 6/2005 | Braithwaite | 2007/0247800 A1 | 10/2007 | Smith et al. |
| 2005/0132405 | A1 | 6/2005 | AbiEzzi | 2008/0108439 A1 | 5/2008 | Cole |
| 2005/0149758 | A1 | 7/2005 | Park | | | |
| 2005/0159823 | A1 | 7/2005 | Hayes et al. | * cited by examiner | | |

INTERNET PROTOCOL BASED MEDIA STREAMING SOLUTION

CROSS REFERENCE TO RELATED APPLICATION

This application claims priority to and the benefit of: Provisional Patent Application No. 60/782,734 filed on Mar. 16, 2006, entitled AUTOMATION CONTROL SYSTEM HAVING A CONFIGURATION TOOL AND TWO-WAY ETHERNET COMMUNICATION FOR WEB SERVICE MESSAGING, DISCOVERY, DESCRIPTIONS, AND EVENTING THAT IS CONTROLLABLE WITH A TOUCH-SCREEN DISPLAY, to Seale MOORER et al.; Provisional Patent Application No. 60/782,596 filed on Mar. 16, 2006, entitled AUTOMATION CONTROL SYSTEM HAVING DIGITAL MEDIA STREAMING, to Seale MOORER et al.; Provisional Patent Application No. 60/782,598 filed on Mar. 16, 2006, entitled AUTOMATION CONTROL SYSTEM HAVING DIGITAL LOGGING, to Seale MOORER et al.; Provisional Patent Application No. 60/782,635 filed on Mar. 16, 2006, entitled AUTOMATION CONTROL SYSTEM HAVING A CONTROL PANEL, to Seale MOORER et al.; Provisional Patent Application No. 60/782,599 filed on Mar. 16, 2006, entitled AUTOMATION CONTROL SYSTEM HAVING A CONFIGURATION TOOL, to Seale MOORER et al.; Provisional Patent Application No. 60/782,600 filed on Mar. 16, 2006, entitled AUTOMATION CONTROL SYSTEM HAVING DEVICE SCRIPTING, to Seale MOORER et al.; Provisional Patent Application No. 60/782,634 filed on Mar. 16, 2006, entitled DEVICE AUTOMATION USING NETWORKED DEVICE CONTROL HAVING A WEB SERVICES FOR DEVICE STACK, to Seale MOORER et al.; Provisional Patent Application No. 60/782,595 filed on Mar. 16, 2006, entitled WIRELESS DIGITAL AMPLIFIER CONFIGURED FOR WALL MOUNTING, SHELF MOUNTING, AND THE LIKE, to Seale MOORER et al.; Provisional Patent Application No. 60/785,275 filed on Mar. 24, 2006, entitled AUTOMATION SYSTEM, to Seale MOORER et al.; Provisional Patent Application No. 60/793,257 filed on Apr. 20, 2006, entitled TOUCH SCREEN FOR USE WITH AUTOMATION SYSTEMS, to Seale MOORER et al.; Provisional Patent Application No. 60/747,726 filed on May 19, 2006, entitled COOLING DEVICE FOR A TOUCH SCREEN AND THE LIKE, to Seale MOORER et al.; Provisional Patent Application No. 60/746,287 filed on May 3, 2006, entitled HOME AUTOMATION SYSTEM AND THE LIKE, to Seale MOORER et al.; Provisional Patent Application No. 60/786,119 filed on Mar. 27, 2006, entitled HOME AUTOMATION PROGRAM CODE FOR SET TOP BOX OR SIMILAR CIRCUIT, to Steve CASHMAN; and Provisional Patent Application No. 60/857,774 filed Nov. 9, 2006, entitled PORTABLE MULTI-FUNCTIONAL MEDIA DEVICE, to Seale MOORER et al., all of which are hereby expressly incorporated by reference for all purposes as if fully set forth herein. Further, this application is related to the following U.S. Patent Applications: U.S. patent application Ser. No. 11/686,826, entitled NETWORK BASED DIGITAL ACCESS POINT DEVICE, filed Mar. 15, 2007, to Seale Moorer, et al.; U.S. patent application Ser. No. 11/686,896, entitled AUTOMATION CONTROL SYSTEM HAVING A CONFIGURATION TOOL AND TWO-WAY ETHERNET COMMUNICATION FOR WEB SERVICE MESSAGING, DISCOVERY, DESCRIPTION, AND EVENTING THAT IS CONTROLLABLE WITH A TOUCH-SCREEN DISPLAY, filed Mar. 15, 2007, to Seale Moorer, et al., now U.S. Patent No. 7,509,402 issued on Mar. 24, 2009; U.S. patent application Ser. No. 11/686,884, entitled AUTOMATION CONTROL SYSTEM HAVING DIGITAL LOGGING, filed Mar. 15, 2007, to Seale Moorer, et al., now U.S. Pat. No. 7,496,627 issued on Feb. 24, 2009; U.S. patent application Ser. No. 11/686,893, entitled USER CONTROL INTERFACE FOR CONVERGENCE AND AUTOMATION SYSTEM, filed Mar. 15, 2007, to Seale Moorer, et al.; U.S. patent application Ser. No. 11/686,846, entitled DEVICE AUTOMATION USING NETWORKED DEVICE CONTROL HAVING A WEB SERVICES FOR DEVICES STACK, filed Mar. 15, 2007, to Seale Moorer, et al., now U.S. Pat. No. 7,587,464 issued on Sep. 8, 2009; U.S. patent application Ser. No. 11/686,875, entitled AUTOMATION CONTROL SYSTEM HAVING A CONFIGURATION TOOL, filed Mar. 15, 2007, to Seale Moorer, et al.; and U.S. patent application Ser. No. 11/686,889, entitled AUTOMATION CONTROL SYSTEM HAVING DEVICE SCRIPTING, filed Mar. 15, 2007, to Seale Moorer, et al., which are all hereby expressly incorporated by reference for all purposes as if fully set forth herein.

BACKGROUND OF THE INVENTION

1. Field of the Invention

The invention is directed to media data streaming, and more particularly to media data streaming in a Web Service environment and/or automation environment.

2. Related Art

Household, academic facility and/or business spaces now more commonly have more than one audio or video device such as CD/DVD player, portable MP3 player, tuner, preamp, power amp, speakers, VCR, DVR, computers running media players or connected to some other source of audio or video (e.g., Internet radio, satellite radio and the like), etc. Typically, a CD/DVD player from one company comes with its own remote control and an amplifier by an entirely different company comes with its own remote control. The same space may have a PC with its keyboard and mouse, and yet another company's portable MP3 player with its own control switches. While each audio device is doing precisely what it was designed to do, each operates completely independent from the others with the possible exception of the portable MP3 player that may be connected to a PC for synchronization. As a result, a user ends up going from one keypad to another or juggling a series of remote controls in order to control the devices.

Since these audio/video and similar devices are not designed to communicate with each other or their communication is very limited, access to these audio/video devices is limited by their physical locations. For example, it is difficult to play an MP3 file saved in a PC hard disk drive in one room or area (a child's bedroom) on speakers located in another room or area (an entertainment room). Thus, in order for a user to enjoy music of his or her choice whenever and wherever he or she wants, each room needs to be equipped with all the necessary audio/video equipment and digital audio/video content.

Also, the audio/video devices are not designed to communicate with other home devices (e.g., TV, lighting, security system, etc.). Thus, it is difficult, if not impossible, to converge the devices for common control for certain occasions. For example, in order to watch a movie, the user must turn on a TV, a DVD player and an audio amplifier by using three different remote controls. Then the user must set the TV to receive a video signal from the DVD player, set the audio amplifier to receive an audio signal from the DVD player and use another control unit to adjust the lighting of the room. Even when a user utilizes a universal remote, as is known in the art, the result is a plurality of devices that are separately operated and are operated separately from a single universal remote. These devices do not converge as described above. Moreover, the devices lack any ability to send or receive media data from a source to a destination.

Accordingly, there is a need for a solution for the aforementioned accessibility, connectability and convergence issues to allow media data to be shared, transferred, or received in any desired device.

SUMMARY OF THE INVENTION

The invention meets the foregoing need using IP based media streaming, which results in a significant increase in accessibility and userability of media data and other advantages apparent from the discussion herein.

Accordingly, in one aspect of the invention, a method of streaming media data in a Web Service environment includes the steps of establishing a media streaming network between a first media device and a second media device, the media streaming network implemented with Web Service for Devices and a real-time media streaming protocol, processing media data for transfer using a media streaming application implemented in the first media device, transferring the processed media data via the media streaming network, receiving the processed media data from the media streaming network, and rendering the processed media data for playback using the media streaming application implemented in the second media device.

The media streaming application may be a filter-based media streaming application. The filter-based media streaming application may include at least one of a filter to read the media data from a file or input, a filter to decode the media data, a filter to transform the media data, and a filter to render the media data. The method may further include the steps of configuring at least one client and at least one device connected to a network, the at least one client and at least one device being configured with web services for devices and further configured to transfer media data with the media streaming application, wherein the at least one client comprises one of a TV, a personal computer, a personal digital assistance, a control panel, and a game controller and the at least one device comprises an audio system, a video system, an intercom system, a lighting system, a security system, and a HVAC system. The real time media streaming protocol may be an internet real-time transport protocol (RTP). The media data may be audio data, video data or a combination of audio and video data. Accordingly, in another aspect of the invention, a system for streaming media data in a Web Service environment, includes a media streaming network implemented with Web Service and configured to transfer media data using a real-time media streaming protocol, a first media device connected to the media streaming network and implemented with a media streaming application for processing media data for transfer, and a second media device connected to the media streaming network and implemented with the media streaming application for rendering the processed media data from the first media device for playback. The media streaming application may be a filter-based media streaming application. The filter-based media streaming application may include at least one of a filter to read the media data from a file or input, a filter to decode the media data, a filter to transform the media data, and a filter to render the media data.

Accordingly, in another aspect of the invention, an automation system may include the system for streaming media data noted above and further may include at least one client and at least one device connected to a network that are configured with web services for devices and further configured to transfer media data with the media streaming application, wherein the at least one client comprises one of a TV, a personal computer, a personal digital assistance, a control panel, and a game controller and the at least one device comprises an audio system, a video system, an intercom system, a lighting system, a security system, and a HVAC system.

The real-time media streaming protocol may be an internet real-time transport protocol (RTP). Each of the first and second media devices may include a network interface connected to the network, and a processor running an operating system (OS), Web Service application and the real-time media streaming application. The media data may be audio data, video data or a combination of audio and video data.

An access point for streaming media data in a Web Service environment, includes a processor running an operating system (OS), a Web Service application and a real time media streaming application, wherein the real time media stream application processes out-bound media data for transfer or renders in-bound media data for playback, a media terminal configured to interface an external media device, wherein the media terminal receives the out-bound media data from the external media device or sends the in-bound media data rendered by the real time media stream application to the external media device, and a network interface connected to a media streaming network implemented with Web Service for Devices and a real-time media streaming protocol, wherein the network interface sends the out-bound media data processed by the real time media stream application to the media streaming network or receive the in-bound media data from the media streaming network.

The media streaming application may be a filter-based media streaming application. The filter-based media streaming application may include at least one of a filter to read the media data from a file or input, a filter to decode the media data, a filter to transform the media data, and a filter to render the media data. An automation system may include the access point as noted above and further may include at least one client and at least one device connected to a network that are configured with web services for devices and further configured to transfer media data with the media streaming application, wherein the at least one client comprises one of a TV, a personal computer, a personal digital assistance, a control panel, and a game controller and the at least one device comprises an audio system, a video system, an intercom system, a lighting system, a security system, and a HVAC system. The real-time media streaming protocol may be an internet real-time transport protocol (RTP). The in-bound and out-bound media data may be audio data, video data or a combination of audio and video data. The media terminal is configured for at least one of audio in, video in and TV signal in. The media terminal may be configured for at least one of audio out or video out.

Accordingly, in another aspect of the invention, an intercom unit for a Web Service environment may include a network interface connected to a media streaming network implemented with a real-time media streaming protocol, a processor configured to run an operating system (OS), a Web Service application and a media stream application, a microphone configured to collect a first voice signal, a speaker that reproduces a second voice signal transferred from the network interface, and a sound card that converts the first voice signal to a digital data stream and converts the second voice signal to an analog data stream, wherein the media stream application processes the first voice signal for transfer and renders the second voice signal for playback.

The real-time media streaming protocol may be an internet real-time transport protocol (RTP). The media streaming application may be a filter-based media streaming application. The filter-based media streaming application may include at least one of a filter to read the media data from a file or input, decode the media data, transform the media data, and render the media data.

Accordingly, in another aspect of the invention, a method of establishing a voice communication in a Web Service environment includes the steps of collecting a first voice signal via a microphone, converting the first voice signal into a digital data stream, processing the digital data stream for transfer using a media streaming application, transferring the processed digital data stream via a media streaming network using a real-time media streaming protocol, receiving the processed digital data stream from the media streaming network, rendering the processed digital data streaming using the media streaming application for playback, converting the rendered digital data stream to an analog audio signal, and playing the analog audio signal via a speaker.

The media streaming application may be a filter-based media streaming application. The filter-based media streaming application may include at least one of a filter to read the media data from a file or input, decode the media data, transform the media data, and render the media data. The real-time media streaming protocol may be an internet real-time transport protocol (RTP).

Accordingly, in another aspect of the invention, a machine-readable medium includes stored instructions, which, when executed by a processor cause the processor to stream media data in a Web Service environment, medium includes instructions for establishing a media streaming network between a first media device and a second media device, the media streaming network implemented with Web Service and a real-time media streaming protocol, instructions for processing media data for transfer using a media streaming application implemented in the first media device, instructions for transferring the processed media data via the media streaming network, instructions for receiving the processed media data from the media streaming network, and instructions for rendering the processed media data for playback using the media streaming application implemented in the second media device.

The media streaming application may be a filter-based media streaming application. The filter-based media streaming application may include at least one of a filter to read the media data from a file or input, decode the media data, transform the media data, and render the media data. The real time media streaming protocol may be an internet real-time transport protocol (RTP). The media data may be audio data, video data or a combination of audio and video data.

Additional features of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings.

DETAILED DESCRIPTION OF THE INVENTION

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

Figure 1:
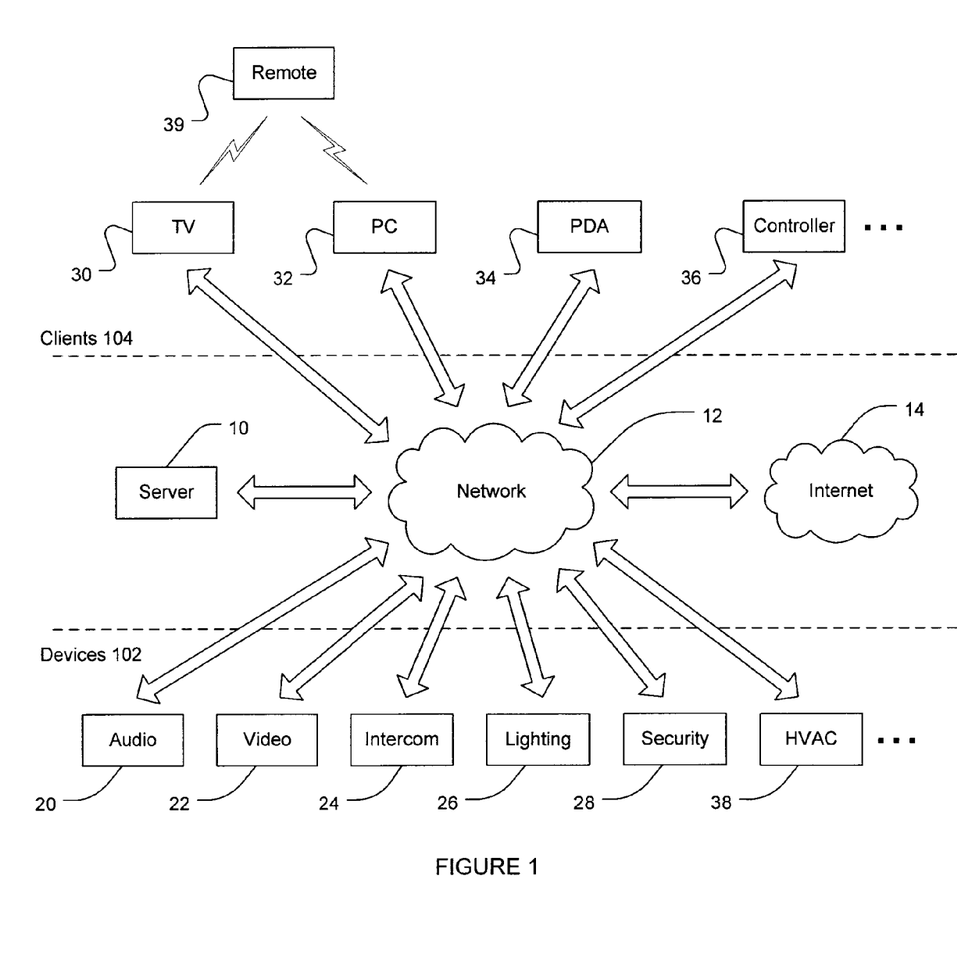
FIG. 1 shows an schematic overview of a convergence solution constructed according to the principles of the invention.

FIG. 1 schematically shows an overview of a convergence solution according to an embodiment of the invention. The convergence solution may be a combination of hardware and software. The hardware may include a server 10 connected to a network 12 (e.g. IP based wired or wireless network such as an Ethernet network) and may possibly be connected to the internet 14, devices 102 (e.g. audio 20, video 22, intercom 24, lighting 26, security system 28, HVAC 38, and the like) and clients 104 (e.g. TV 30, personal computer (PC) 32, personal digital assistance (PDA) 34, controller 36 such as a control panel, game controller (i.e. X-Box™, not shown) and the like). Moreover, the clients 104 may include a remote control 39 or a remote control may be configured to be a client 104. The server 10 may be any type of computer, such as a PC connected to the network 12. The clients 104 such as clients 30, 32, 34, 36 provide a user with control over the devices 102 such as devices 20, 22, 24, 26, 28, 38.

The software (i.e., application) enables the hardware such as the server 10, devices 102 and clients 104 to communicate with each other despite their different proprietary languages and communication protocols, and may provide the user with control over most or all the hardware from a single client. The application may utilize at least one portion of the hardware to send commands to the devices 102 and receive feedback from them. The application may integrate centralized device control into a PC based media environment (e.g., Microsoft Media Center™ environment) that may store, organize and play digital media content. The user may use the same remote control 39 to listen to music, watch and record television, enjoy family photographs and home movies, as well as adjust the lighting, secure the home, adjust the temperature, distribute music throughout the house, check surveillance cameras and the like.

The application may be implemented with Web Services. The Web Services use standard Internet protocol (IP) and are based on standard XML-related technologies such as SOAP (Simple Object Access Protocol) for communications and WSDL (Web Services Device Language) to describe interfaces. The devices implemented with Web Service for Device (WSD) become black boxes on the network, providing services to any application, on any platform, written in any language. Moreover, the use of WSD allows for the capabilities of Universal Plug and Play (UPnP) that seamlessly connect and simplify implementation.

Alternatively or additionally, if the server 10 or the PC 32 is running a SideShow™ enabled operating system such as Microsoft Windows Vista™, the devices may be configured as a SideShow™ device or "gadget." A SideShow™ device or gadget may communicate with any client or device implemented with WSD in the network via protocols according to SideShow™ XML communication specifications. Moreover, the server 10 or the PC 32 using Microsoft Windows Vista™ may be running a SideShow™ gadget application running on the Microsoft Windows Vista™ computer providing a user interface rendering for the device that communicates with automation control devices via WSD technology.

Figure 2:
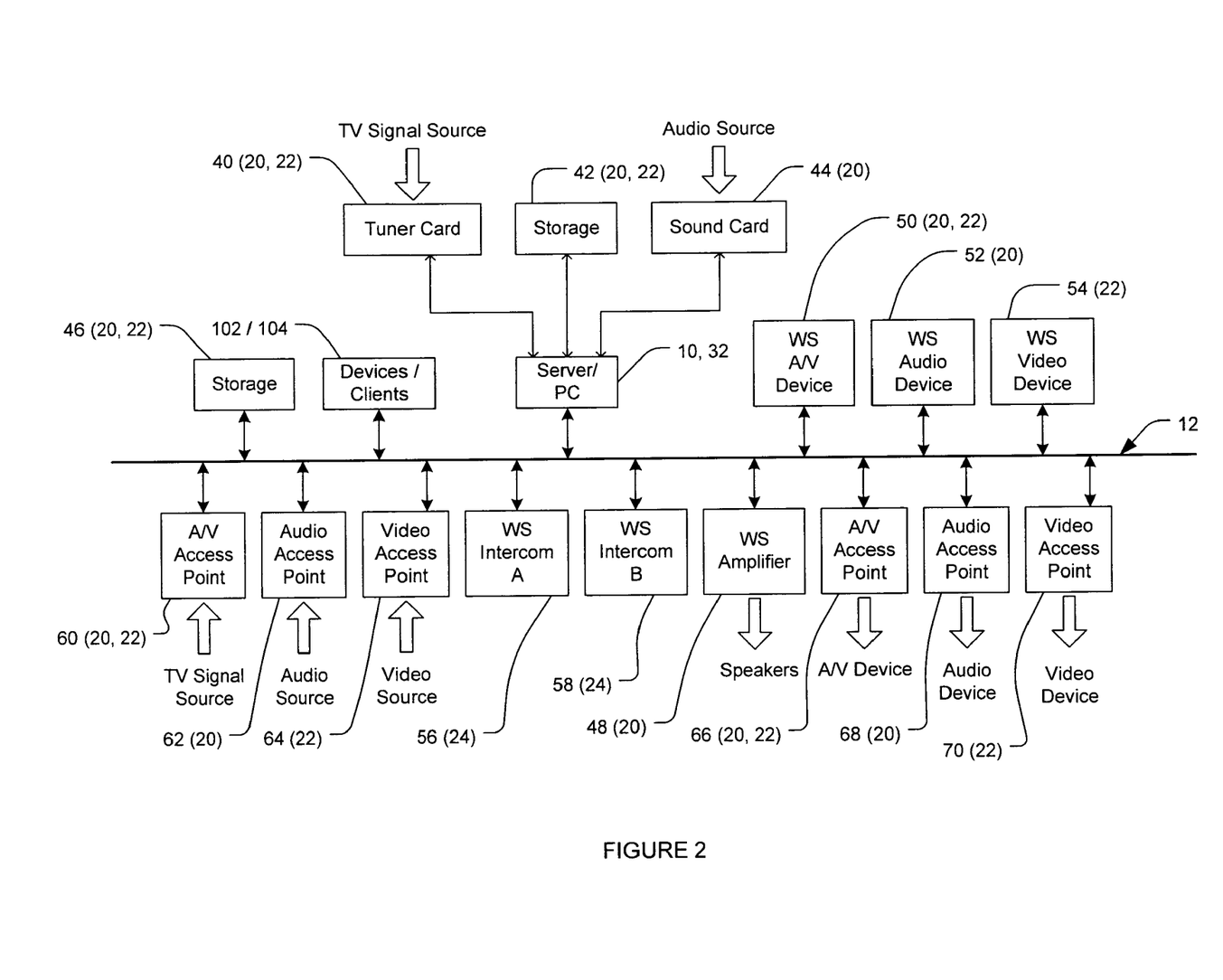
FIG. 2 schematically shows various media devices configured and connected to a network, for use in the convergence solution of FIG. 1, constructed according to principles of the invention.

FIG. 2 schematically shows various media devices configured and connected to the network 12, for use in the convergence solution of FIG. 1, constructed according to principles of the invention. In particular, FIG. 2 shows media devices, such as the plural audio devices 20, video devices 22 and intercom system 24 of FIG. 1 that may be configured and connected to the convergence system according to an embodiment of the invention. These media devices may be any type of devices configured to receive, store, transfer and play media files or signals. For example, a tuner card 40, storage 42, and sound card 44 are connected to the server 10 or alternatively/additionally a PC 32).

The tuner card 40 may be any type of well-known card capable of receiving video signals that may be connected to a TV signal source such as an antenna, cable box, satellite receiver, or the like, and may provide a TV signal to any of the devices 102 or clients connected to the network 12. The tuner card 40 may convert the TV signal from an analog format to a digital format. The storage 42 may be a hard disk drive, memory card/reader, CD/DVD ROM driver, MP3 player, or the like, and stores, at least for example, digital audio/video (media) content. The sound card 44 may be any type of well-known sound card capable of receiving audio signals and may be connected to an audio signal source such as a microphone, audio player, or the like, and may provide an audio signal from the audio signal source to any of the devices connected to the network 12. The sound card 44 may convert the audio signal from the analog format to the digital format. Although FIG. 2 shows the tuner card 40, storage 42 and sound card 44 connected to the server 10, these devices may be connected to the network 12 via different devices or connected directly to the network 12. For example, a storage 46, such as a network storage, may be directly connected to the network 12.

Media devices implemented with Web Services may be directly connected to the network. For example, a Web Services (WS) enabled amplifier 48, WS enabled audio/video (A/V) device 50, WS enabled audio device 52 and WS enabled video device 54 may be directly connected to the network 12, and a user may control these devices 50, 52, 54 from any of the clients 104 (shown in detail in FIG. 1). For example, by using the TV 30 located in a living room and its remote control 39, the user may select an MP3 file stored in the storage 42 or 46 in a child's room and play the file through the WS audio device 52 in a dining room or the WS amplifier 48 in the living room. Also, by using the controller 36, the user may select the TV signal received by the tuner card 40 located in a basement and play the TV signal through the WS A/V device 50, such as a TV, located in a bed room. Thus, according to the invention, the user may access any type of media files or signals whenever and wherever he or she wants.

For those media devices that are not implemented with Web Services, access points may be used to connect those devices to the network 12. For example, if a TV signal source and the tuner card 40 are located in separate rooms, an A/V access point 60 implemented with Web Services may be used to connect the TV signal source to the network. The A/V access point 60 may be equipped with a tuner card and connected to the network 12 wirelessly.

Similarly, an audio source and video source may be connected to the network 12 via an audio access point 62 and video access point 64, respectively. While the access points 60, 62, 64 may be used to interface between the media sources (e.g. TV, audio and video signal sources, and the like), the same access points may be used as media playback devices (e.g. TV, stereo system, video monitor, and the like). For example, an A/V access point 66 implemented with Web Services may provide a TV with a TV signal received from the tuner card 40 or the TV signal received from the A/V access point 60. An audio access point 68 may provide an audio playback device with an MP3 file stored in the storage 46. A video access point 70 may provide a monitor with the video signal received from the video access point 64. By using the same operational principles of the audio access point 62 and 68, an intercom system may be implemented. Such access points may utilize the technology disclosed in Applicant's copending patent application U.S. Patent Application No. (to be assigned), entitled NETWORK BASED DIGITAL ACCESS POINT DEVICE, filed Mar. 14, 2007, to Seale Moorer, et al. incorporated herein by reference in its entirety.

Figure 3:
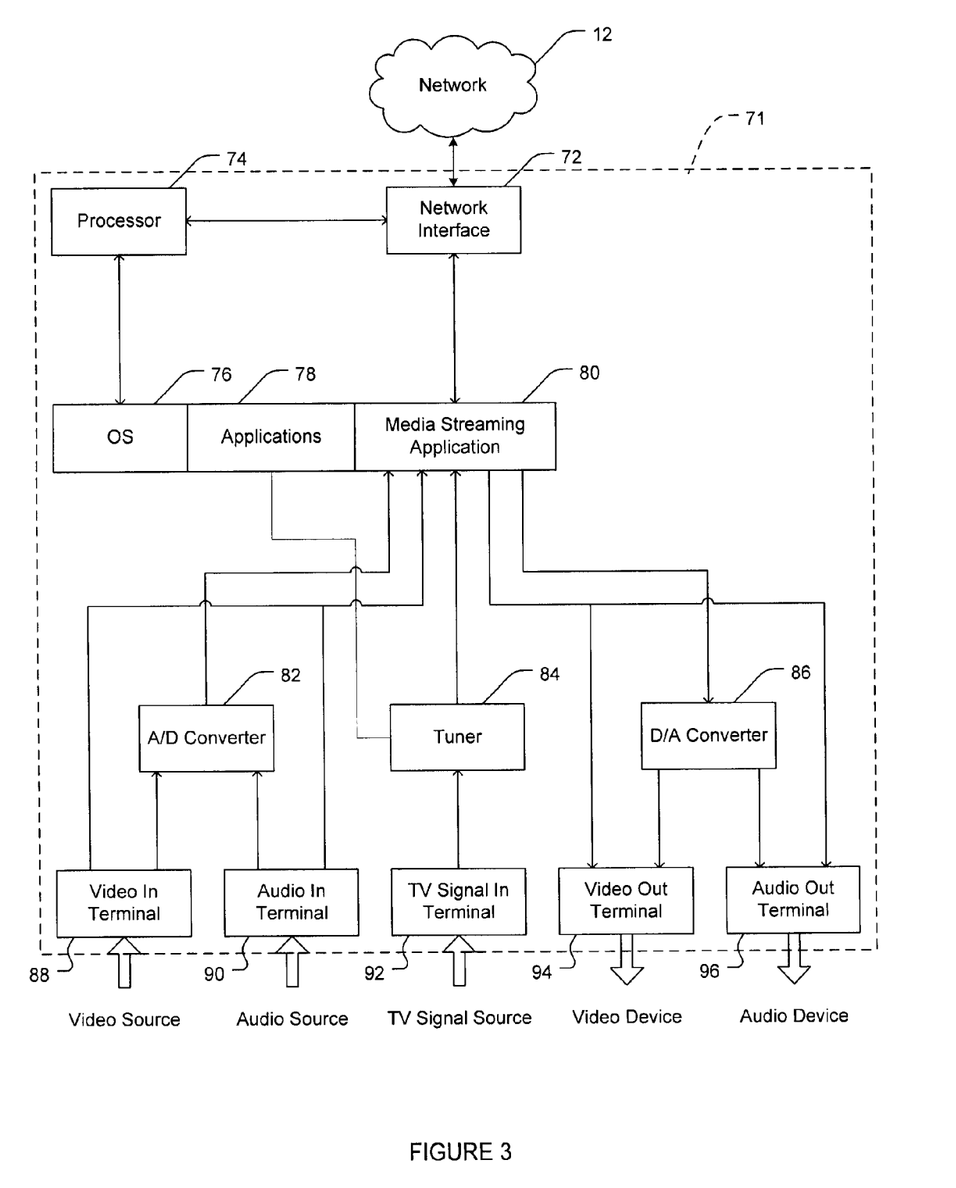
FIG. 3 schematically shows a structure of a digital audio/video access point constructed according to the principles of the invention.

FIG. 3 schematically shows a structure of a digital audio/video access point constructed according to the principles of the invention. In particular, FIG. 3 shows exemplary structure of an access point 71, such as the access points 60, 62, 64, 66, 68, 70 shown in FIG. 2, according to an embodiment of the invention. The access point 71 may be equipped with a network interface 72 that allows the access point 71 to communicate with the server 10, the clients 104, the devices 102 (such as 40, 42, 44, 46, 48, 50, 52, 54, 56, 58 and other access points 60, 62, 64, 66, 68, 70 of FIG. 2 via the IP network 12. The network interface 72 may be a wired or wireless interface. The network interface 50 may connect using Wi-Fi (Wireless Fidelity IEEE 802.11x), bluetooth™, Fire Wire™ (IEEE 1394), power line, wired Ethernet, and the like and any future protocols.

The access point 71 may include a processor 74 that may run an operating system (OS) and applications to implement Web Services in the access point 71. Thus, upon being connected to the network 12, the access point 71 may be quickly recognized as a device in the network 12 and controlled by the server 10 and the clients 104.

The processor 74 may also run a media streaming application 80, such DirectShow™ (available from Microsoft™ Redmond, Wash.), to provide a common interface for the media files. DirectShow™ divides a media processing task (e.g. video or audio playback task) into a set of steps known as filters. DirectShow™ filter graphs may be used in video playback, in which the filters provide steps such as file parsing, video/audio de-multiplexing, decompressing, rendering and the like. Of course the invention contemplates any similar or future application of DirectShow™, filter-graph application, and the like.

Figure 7:
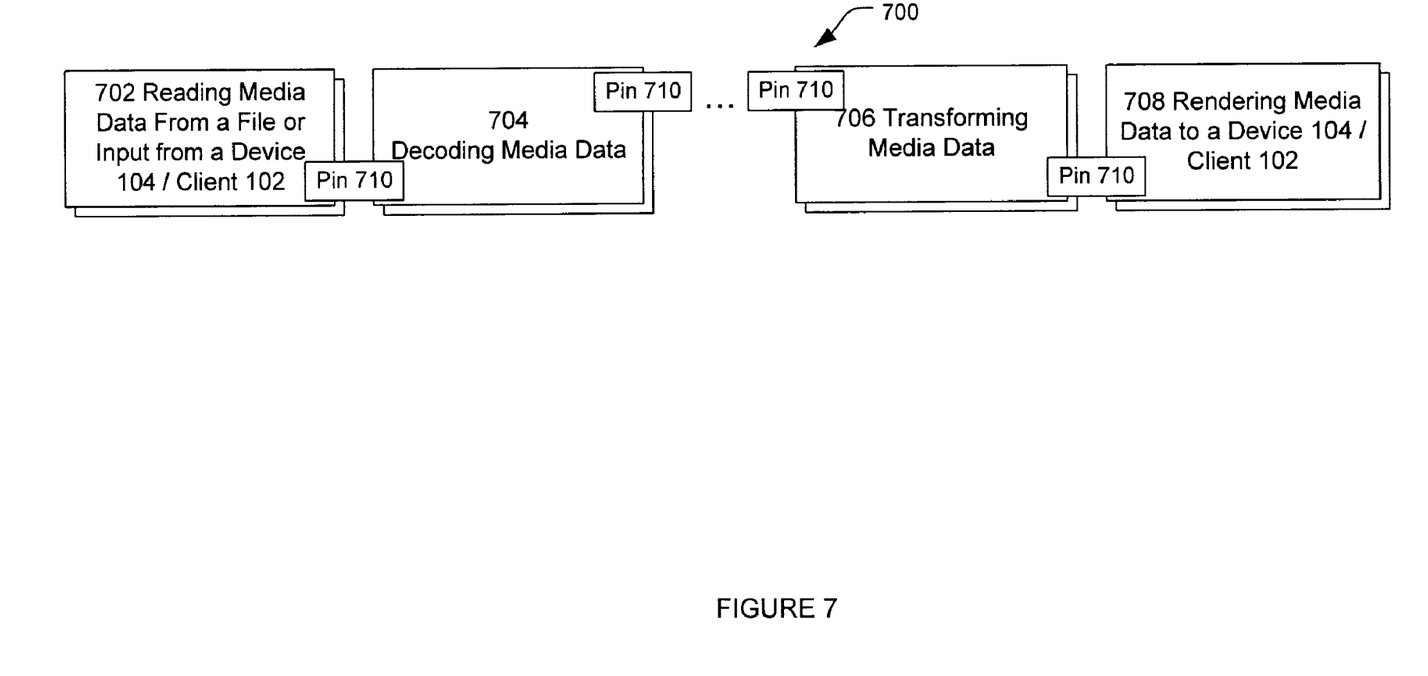
FIG. 7 schematically shows processing stages of a media streaming application constructed according to and used with the invention.

More specifically as shown in FIG. 7, a media streaming application such as a filter based media streaming application that may be for example DirectShow™ may be used. Such an application may be a multimedia framework and API 700 to perform operations with media files and the like. It may be an extensible, filter-based framework that can render or record media files on demand. Each filter (702, 704, 706, 708) represents a stage in the processing of the media data, e.g. reading media data from a file or input 702, decoding media data 704, transforming media data 706 or rendering media data 708. It should be noted that only an exemplary number of filters are shown. Other filters may be integrated at any stage of processing as needed.

The filter may include a number of pins 710 that represent connection points on the filter that may be connected to other filters. Pins 710 may be either output or input points. Depending on the filter, data is either requested from an output pin or sent to an input pin in order to transfer data between filters. The filters may be built using a set of C++ classes provided in the DirectShow SDK, called the DirectShow(tm) Base Classes. These handle much of the creation, registration and connection logic for the filter. For the filter graph to use filters automatically, they need to be registered in a separate DirectShow registry entry as well as being registered with COM. This registration can be managed by the DirectShow Base Classes. However, if the application adds the filters manually, they do not need to be registered at all.

The access point 71 may further include an analog to digital (A/D) converter 82, a TV tuner 84, a digital to analog (D/A) converter 86, video in terminal 88, audio in terminal 90, TV signal in terminal 92, video out terminal 94 and audio out terminal 96. Thus, the access point 71 may be capable of handling various media streams (e.g., TV signal, video signal and audio signal). While these components allow the access point 71 to interface with various types of devices, the access point 71 may be equipped with fewer components than what are shown in FIG. 3. For example, if the video and audio signals received by the video in and audio in terminals 88 and 90 are exclusively digital, the A/D converter may not be necessarily be needed.

Also, if the access point 71 is only used to interface a TV signal source, other components, such as the A/D converter 82, D/A converter 86, video in terminal 88, audio in terminal 90, video out terminal 94, and audio out terminal 96, may not be required. Thus, the access point 71 may include only necessary components for a specific purpose.

In operation, the video in terminal 88 may receive a video data stream from a video source, such as a camcorder, security camera, camera phone, VCR, DVD player, portable media player, DVR, game controller, or the like. Any kind of video in is contemplated by the invention including composite, s-video, component, HDMI (High Definition Multimedia Interface), DVI (Digital Video Interface) including DVI-A, DVI-D and DVI-I, IEEE 1394 (FireWire™), RGBHV, RGBS and the like and any future protocols thereof. If the video streaming data is in an analog format, the video stream data is converted to a digital data stream by the A/D converter 82. The digital video stream data from the A/D converter 82 or the video in terminal 88 are processed by the media streaming application 80. The processed video data stream is then transferred to the network 12 via the network interface 72 using a standard internet protocol, such as internet real-time transport protocol (RTP). The data part of RTP is a thin protocol providing support for applications with real-time properties such as continuous media, including timing, reconstruction, loss detection, security and content identification. Thus, RTP provides support for real-time conferencing of a group of any size within the internet. This support includes source identification and support for gateways like audio and video bridges as well as a multicast-to-unicast translator. RTP further offers quality-of-service feedback from receivers to the multicast group as well as support for the synchronization of different media streams.

Similar to the video data stream, the audio in terminal 90 may receive an audio data stream from an audio source such as a microphone, radio, CD/DVD player, portable media player, or the like. Any type of audio in terminal is contemplated by the invention including RCA, SPDIF, AES, EBU, TOSLINK, XLR interfaces and the like and any future protocols. If necessary, the audio data stream in the analog format may be converted to a digital audio data stream by the A/D converter 82. The digital audio data stream from the A/D converter 82 or the audio in terminal 90 may be processed by the processor 74 using the media streaming application 80 such as DirectShow™, and transferred to the network via network interface 72 using the internet standard protocol such as RTP. Similarly, the TV signal in terminal 92 may receive a TV signal from the TV signal source such as an antenna, cable outlet, set-top box, VCR, DVD, DVR, game controller or the like. The TV signal may then be converted to a digital media steam by the tuner 84. The digital TV signal stream is processed using the media streaming application 80, such as DirectShow™, for real-time multicast or unicast via the network 12 using the internet standard protocol, such as RTP. The tuner 84 may communicate with the Web Service Application 78 such that a user can control the tuner 84 via the clients 104.

In addition to interfacing the media sources as mentioned above, the access point 71 may interface media playback devices, such as an A/V device, video device or audio device, in order to play back the media stream data transferred from the network 12. For example, an audio data stream, which has been previously processed by a different device or access point using the media streaming application is transferred to the network interface 72 via the network 12 using the internet standard protocol. The audio data stream is then rendered by processor 74 using the media streaming application for playback. The rendered audio data stream may be converted to the analog format by the D/A converter 86 if necessary. The audio data stream rendered by the media stream application 80 may then be transferred to the audio device via the audio out terminal 96. Similarly to the audio in terminal, any type of audio is contemplated by the invention including RCA, SPDIF, AES, EBU, TOSLINK, XLR, interfaces and the like and any future protocols.

The video data stream from the network 12 is processed in a similar manner with the audio data stream. Since the access point 71 is configured to interface both the media sources and media playback devices, a real-time end-to-end media streaming may be established by using two or more access points 71.

Figure 4:
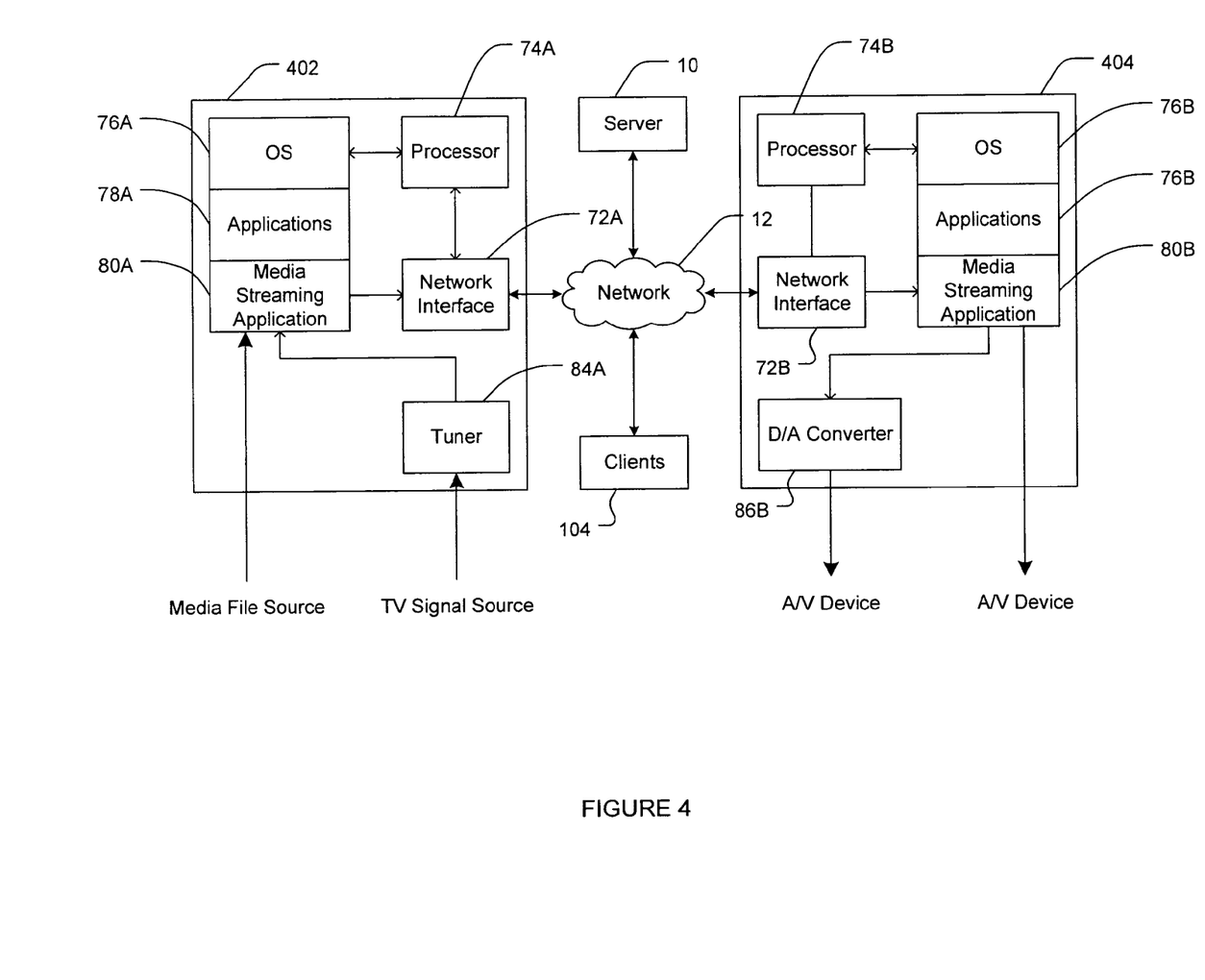
FIG. 4 schematically shows a structure of a media streaming system constructed according to the principles of the invention.

FIG. 4 shows a structure of a media streaming system according to an embodiment of the invention. The media streaming system includes two or more media streaming units such as the first and second media streaming units 402 and 404. The server 10, the clients 104 and the first and second media streaming units 402, 404 are all connected to the network 12 and implemented with WSD. Thus, the first media streaming unit 402 and the second media streaming unit 404 may be controlled by the server 10 and/or the clients 104. In this embodiment, the first media streaming unit 402 is configured to interface the media sources, and the second media stream unit 404 may be configured to interface the media playback devices. However, both media streaming units 402, 404 may be configured to interface either one of the media source and media playback device or both, as described in FIG. 3 above. The first media stream unit 402 may include a network interface 72A, a processor 74A and a tuner 84A. The tuner 84A may receive a TV signal from an external TV signal source. The TV signal may be processed by the processor 74A using the media streaming application 80A. Non-TV signals, such as digital moving picture data may be also processed using the media streaming application 80A as noted by the input arrow 406. The processed media stream may then be transferred to the second media streaming unit 404 via the network interface 72A and the network 12 using the internet standard protocol. The second media stream unit 404 may include a network interface 72B, a processor 74B, and a D/A converter 86. The media stream received by the network interface 72B may be rendered for playback by a media streaming application 80B. The rendered media stream may be streamed to an A/V device directly (if the device accepts digital signals) or via the D/A converter 86B if analog signals are needed.

Figure 5:
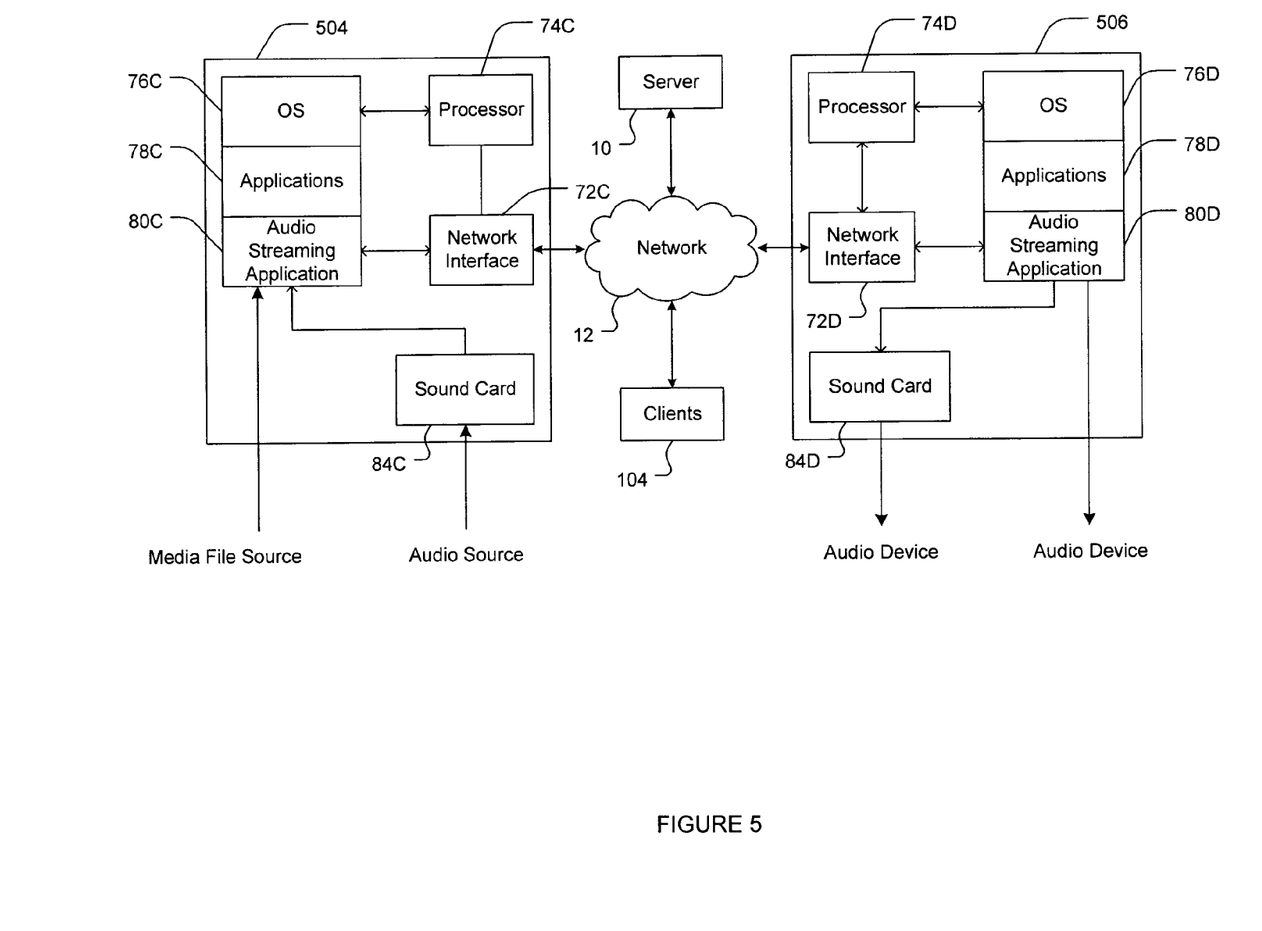
FIG. 5 schematically shows a structure of an audio streaming system constructed according to the principles of the invention.

FIG. 5 shows a structure of an audio streaming system according to an embodiment of the invention. The audio streaming system may include two or more media streaming units such as the first and second audio streaming units 504 and 506. The server 10, the clients 104 and the first and second audio streaming units 504, 506 may all be connected to the network 12 and implemented with WSD. Thus, the first audio streaming unit 504 and the second audio streaming unit 506 may be controlled by the server 10 and the clients 104. In this embodiment, the first audio streaming unit 504 may be configured to interface the audio sources, and the second audio stream unit 506 may be configured to interface the audio (playback) devices. However, both of the audio streaming units 504, 506 may be configured to interface with either one of the audio source device and audio (playback) device or both, as described in FIG. 3 above. The first audio streaming unit 504 may include a network interface 72C, processor 74C, and a sound card 84C. The sound card 84C may receive an audio signal from an external audio signal source. The audio signal may be processed by the processor 74C using the audio streaming application 80C. A digital audio data stream may bypass the sound card 84C when it is from a digital "media file source." The processed audio stream may then be transferred to the second audio streaming unit 506 via the network interface 72C and the network 12 using the internet standard protocol. The second audio stream unit 506 may include a network interface 72D, a processor 74D, and a sound card 84D. The audio stream received by the network interface 72D may be rendered for playback by a media streaming application 80D. The rendered media stream may be streamed out to an audio playback device directly (digitally) or via the sound card 84D to generate an analog signal.

Figure 6:
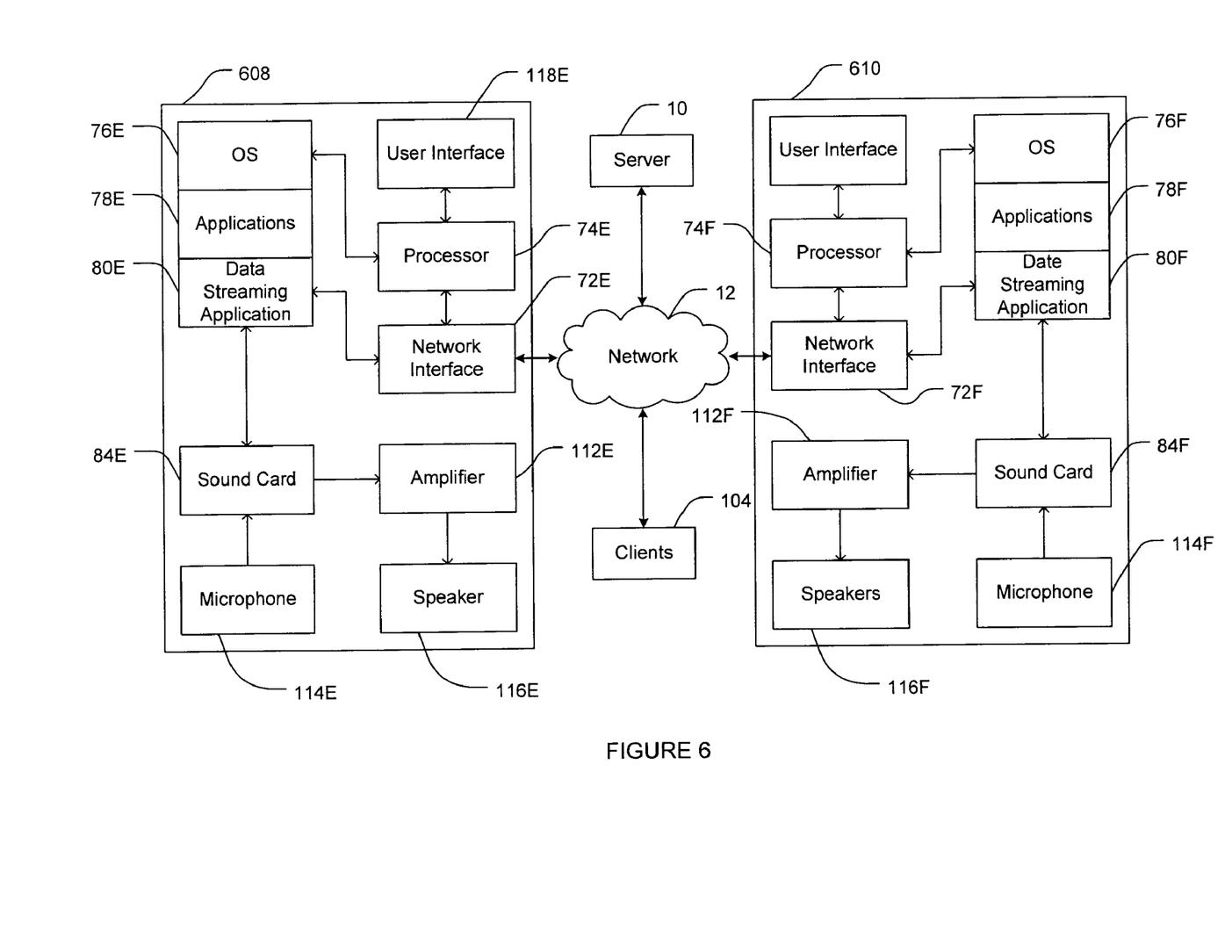
FIG. 6 schematically shows a structure of an intercom system constructed according to the principles of the invention.

FIG. 6 shows a structure of an intercom system according to an embodiment of the invention. The intercom system may include two or more intercom units such as the first and second intercom units 608 and 610. The server 10, the clients 104 and the first and second intercom units 608, 610 may all be connected to the network 12 and implemented with Web Service. The first intercom unit 608 may include a network interface 72E, processor 74E and sound card 84E, amplifier 112E, microphone 114E, speaker 116E and user interface 118E. The microphone 114E captures a voice (or other audio) from the first user, and the sound card 84E converts the voice signal to a digital data stream. The data stream is then processed by the data streaming application 80E, as described above, and transferred to the second intercom unit 610 via the network interface 72E and the network 12. Also, the data stream transferred from the second intercom unit 610 via the network 12 and the network interface 72E may be rendered for playback by the processor 76E using the data streaming application 80E. The rendered data stream may be converted to an analog audio signal by the sound card 84E, amplified by the amplifier 112E, and transferred to the speaker 116E, which recreates the voice from the second intercom unit 610. The user interface 118E provides the user with various control options such that the user may select an intercom in a different location for communication, start intercom processing, stop intercom processing, and the like. The second intercom unit 610 includes a network interface 72F, a processor 74F, a sound card 84F, an amplifier 112F, a microphone 114F, a speaker 116F and a user an interface 118F. The second intercom unit 610 operates in substantially the same manner as the first intercom unit 608. More intercom units may be added if necessary or desired and the data streaming application such as DirectShow™, enables both multicast and unicast of any data stream over the multiple intercom units.

In accordance with various embodiments of the invention, the methods described herein are intended for operation with dedicated hardware implementations including, but not limited to, semiconductors, application specific integrated circuits, programmable logic arrays, and other hardware devices constructed to implement the methods and modules described herein. Moreover, various embodiments of the invention described herein are intended for operation with as software programs running on a computer processor. Furthermore, alternative software implementations including, but not limited to, distributed processing or component/object distributed processing, parallel processing, virtual machine processing, any future enhancements, or any future protocol can also be used to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed is:

1. A method of streaming media data in a Web Service environment, comprising the steps of:
   implementing a first media device and a second media device with a filter-based media streaming framework and a Web Service for Devices (WSD) interface;
   establishing a network between the first media device and the second media device;
   processing media data at the first media device for transfer using the filter-based media streaming framework;
   transferring the processed media data from the first media device to the second media device via the network according to a real-time media streaming protocol; and
   rendering the processed media data at the second media device using the filter-based media streaming framework,
   wherein the WSD interface implemented to the first and second media devices enables communication between the first and second media devices via the network according to a WSD protocol, the WSD protocol comprising:
   a first communication layer configured to logically interface at least one client, the at least one client configured to control a plurality of devices comprising the first and second media devices;
   a second communication layer configured to physically interface the plurality of devices; and
   a service provider layer comprising one or more components provided corresponding to one or more device categories, respectively, each component including at least one of the plurality of devices of the same device category;
   wherein the filter-based media streaming framework comprises at least one of a filter to read the media data from a file or input, a filter to decode the media data, a filter to transform the media data, and a filter to render the media data; and
   wherein each component comprises: one or more Web Services provided corresponding to one or more of the plurality of devices of the corresponding device category, respectively, each Web Service configured to function as a Web Service host for the corresponding device;
   one or more device bridges provided corresponding to the one or more Web Services, respectively, each device bridge configured to translate communication between the corresponding Web Service and device; and
   a controller configured to communicate with the one or more of the plurality of devices of the corresponding device category.

2. The method according to claim 1, further comprising:
   implementing the at least one client and the plurality of devices with the WSD interface; and
   connecting the at least one client and the plurality of devices to the network,
   wherein the at least one client comprises at least one of a TV, a personal computer, a personal digital assistance, a control panel, and a game controller, and the plurality of devices further comprise at least one of an audio system, a video system, an intercom system, a lighting system, a security system, and a HVAC system.

3. The method of claim 1, wherein the real-time media streaming protocol comprises an internet real-time transport protocol (RTP).

4. The method of claim 1, wherein the media data comprises at least one of audio data and video data.

5. A system for streaming media data in a Web Service environment, comprising:
   a first media device implemented with Web Service for Devices (WSD) interface and a filter-based media streaming framework for processing media data for transfer; and
   a second media device implemented with the WSD interface and the filter-based media streaming framework application for rendering the processed media data for playback; and
   a network connected to the first media device and the second media device for transferring the processed media data according to a real-time media streaming protocol,
   wherein the WSD interface implemented to the first and second media devices enables communication between the first and second media devices via the network according to a WSD protocol, the WSD protocol comprising:
   a first communication layer configured to logically interface at least one client, the at least one client configured to control a plurality of devices comprising the first and second media devices;
   a second communication layer configured to physically interface the plurality of devices; and
   a service provider layer comprising one or more components provided corresponding to one or more device categories, respectively, each component including at least one of the plurality of devices of the same device category;
   wherein the filter-based media streaming framework comprises at least one of a filter to read the media data from a file or input, a filter to decode the media data, a filter to transform the media data, and a filter to render the media data; and
   wherein each component comprises: one or more Web Services provided corresponding to one or more of the plurality of devices of the corresponding device category, respectively, each Web Service configured to function as a Web Service host for the corresponding device;
   one or more device bridges provided corresponding to the one or more Web Services, respectively, each device bridge configured to translate communication between the corresponding Web Service and device; and
   a controller configured to communicate with the one or more of the plurality of devices of the corresponding device category.

6. An automation system comprising the system of claim 5, wherein the at least one client comprises at least one of a TV, a personal computer, a personal digital assistance, a control panel, and a game controller, and the plurality of devices further comprise at least one of an audio system, a video system, an intercom system, a lighting system, a security system, and a HVAC system.

7. The system of claim 5, wherein the real-time media streaming protocol comprises an internet real-time transport protocol (RTP).

8. The system of claim 5, wherein each of said first and second media devices comprises:
   a network interface connected to the network; and
   a processor running an operating system (OS), the WSD interface and the filter-based media streaming framework.

9. The system of claim 5, wherein the media data comprises at least one of audio data and video data.

10. An access point for streaming media data in a Web Service environment, comprising:
   a processor running an operating system (OS), a Web Service for Devices (WSD) interface and a filter-based media streaming framework for performing at least one of processing out-bound media data for transfer and rendering in-bound media data for playback;
   a media terminal configured to interface an external media device, wherein the media terminal performs at least one of receiving the out-bound media data from the external media device and sending the in-bound media data rendered by the media streaming application to the external media device; and
   a network interface connected to a network and configured to perform at least one of transferring the out-bound media data from the access point and transferring the in-bound media data to the access point according to a real-time media streaming protocol,
   wherein the WSD interface implemented to the access point enables communication between the access point and any media or non-media device connected to the network and implemented with the WSD interface according to a WSD protocol, the WSD protocol comprising:
      a first communication layer configured to logically interface at least one client, the at least one client configured to control a plurality of devices comprising the first and second media devices;
      a second communication layer configured to physically interface the plurality of devices; and
      a service provider layer comprising one or more components provided corresponding to one or more device categories, respectively, each component comprising at least one of the plurality of devices of the same device category;
   wherein the filter-based media streaming framework comprises at least one of a filter to read the media data from a file or input, a filter to decode the media data, a filter to transform the media data, and a filter to render the media data; and
   wherein each component comprises: one or more Web Services provided corresponding to one or more of the plurality of devices of the corresponding device category, respectively, each Web Service configured to function as a Web Service host for the corresponding device;
   one or more device bridges provided corresponding to the one or more Web Services, respectively, each device bridge configured to translate communication between the corresponding Web Service and device; and
   a controller configured to communicate with the one or more of the plurality of devices of the corresponding device category.

11. An automation system comprising the access point of claim 10, wherein the at least one client comprises at least one of a TV, a personal computer, a personal digital assistance, a control panel, and a game controller, and the plurality of devices further comprise at least one of an audio system, a video system, an intercom system, a lighting system, a security system, and a HVAC system.

12. The access point of claim 10, wherein the real-time media streaming protocol comprises an internet real-time transport protocol (RTP).

13. The access point of claim 10, wherein the in-bound and out-bound media data comprise at least one of audio data and video data.

14. The access point of claim 10, wherein the media terminal comprises at least one of an audio in terminal, a video in terminal and a TV signal in terminal.

15. The access point of claim 10, wherein the media terminal comprises at least one of an audio out terminal and a video out terminal.

16. An intercom unit for a Web Service environment, comprising:
   a network interface connected to a network;
   a microphone configured to collect out-bound voice sound and convert the out-bound voice sound to a first analog signal;
   a speaker configured to reproduce in-bound voice sound based on a second analog signal; a sound processing unit configured to convert the first analog signal to a first digital data stream and convert a second digital media stream received from the network to the second analog signal; and
   a processor configured to operate an operating system (OS), a Web Service for Devices (WSD) interface and a filter-based media stream framework,
   wherein the WSD interface enables communication with another device implemented with the WSD interface via the network according to a WSD protocol, and
   the filter-based media streaming application framework processes the first digital data stream according to a real time media stream protocol for transfer and renders the second digital data stream according to the real time media streaming protocol for playback according to a real- time media streaming protocol,
   wherein the WSD protocol comprises:
      a first communication layer configured to logically interface at least one client, the at least one client configured to control a plurality of devices comprising the intercom unit;
      a second communication lager configured to physically interface the plurality of devices; and
      a service provider layer comprising one or more components provided corresponding to one or more device categories, respectively, each component comprising at least one of the plurality of devices of the same device category;
   wherein the filter-based media streaming framework comprises at least one of a filter to read media data from a file or input, decode the media data, transform the media data, and render the media data; and
   wherein each component comprises: one or more Web Services provided corresponding to one or more of the plurality of devices of the corresponding device category, respectively, each Web Service configured to function as a Web Service host for the corresponding device;
   one or more device bridges provided corresponding to the one or more Web Services, respectively, each device bridge configured to translate communication between the corresponding Web Service and device; and
   a controller configured to communicate with the one or more of the plurality of devices of the corresponding device category.

17. The intercom unit of claim 16, wherein the real-time media streaming protocol comprises an internet real-time transport protocol (RTP).

18. A method of establishing a real-time voice communication in a Web Service environment, comprising the steps of:
implementing first and second voice communication units with a filter-based media streaming framework and a Web Service for Devices (WSD) interface;
collecting a first voice sound at the first voice communication unit;
converting the first voice sound into a digital data stream at the first voice communication unit;
processing the digital data stream at the first voice communication unit for transfer using the filter-based media streaming framework;
transferring the processed digital data stream to the second voice communication unit via the network according to a real-time media streaming protocol;
rendering the processed digital data streaming at the second voice communication unit for playback using the filter-based media streaming framework;
converting the rendered digital data stream to an analog audio signal at the second voice communication unit; and
recreating the first voice sound based on the analog audio signal at the second voice communication unit;
wherein the WSD interface implemented to the first and second voice communication units enables communication therebetween via the network according to a WSD protocol, the WSD protocol comprising:
a first communication layer configured to logically interface at least one client, the at least one client configured to control a plurality of devices comprising the first and second voice communication units;
a second communication layer configured to physically interface the plurality of devices; and
a service provider layer comprising one or more components provided corresponding to one or more device categories, respectively, each component including at least one of the plurality of devices of the same device category;
wherein the filter-based media streaming framework comprises at least one of a filter to read a digital data stream from a file or input, decode the digital data stream, transform the digital data stream, and render the digital data stream; and
wherein each component comprises: one or more Web Services provided corresponding to one or more of the plurality of devices of the corresponding device category, respectively, each Web Service configured to function as a Web Service host for the corresponding device;
one or more device bridges provided corresponding to the one or more Web Services, respectively, each device bridge configured to translate communication between the corresponding Web Service and device; and
a controller configured to communicate with the one or more of the plurality of devices of the corresponding device category.

19. The method of claim 18, wherein the real-time media streaming protocol comprises an internet real-time transport protocol (RTP).

20. A non-transitory machine-readable storage medium comprising stored instructions, which, when executed by a processor cause the processor to stream media data in a Web Service environment, the storage medium comprising:
instructions for implementing a first media device and a second media device with a filter-based media streaming framework and a Web Service for Devices (WSD) interface;
instructions for establishing a network between the first media device and the second media device;
instructions for processing media data at the first media device for transfer using the filter-based media streaming framework;
instructions for transferring the processed media data from the first media device to the second media device via the network according to a real-time media streaming protocol; and
instructions for rendering the processed media data for playback using the filter-based media streaming framework,
wherein the WSD interface implemented to the first and second media devices enables communicate therebetween via the network according to a WSD protocol, the WSD protocol comprising:
a first communication lager configured to logically interface at least one client, the at least one client configured to control a plurality of devices comprising the first and second media devices;
a second communication lager configured to physically interface the plurality of devices; and
a service provider layer comprising one or more components provided corresponding to one or more device categories, respectively, each component including at least one of the plurality of devices of the same device category;
wherein the filter-based media streaming framework comprises at least one of a filter to read the media data from a file or input, decode the media data, transform the media data, and render the media data; and
wherein each component comprises: one or more Web Services provided corresponding to one or more of the plurality of devices of the corresponding device category, respectively, each Web Service configured to function as a Web Service host for the corresponding device;
one or more device bridges provided corresponding to the one or more Web Services, respectively, each device bridge configured to translate communication between the corresponding Web Service and device; and
a controller configured to communicate with the one or more of the plurality of devices of the corresponding device category.

21. The storage of claim 20, wherein the real time media streaming protocol comprises an internet real-time transport protocol (RTP).

22. The storage of claim 20, wherein the media data comprises at least one of audio data and video data.

* * * * *